United States Patent

[11] 3,620,275

| [72] | Inventor | Paul R. Himes<br>R.D. 3, Box 186-A, Putnam, N.Y. 10579 |
|---|---|---|
| [21] | Appl. No. | 811,017 |
| [22] | Filed | Mar. 27, 1969 |
| [45] | Patented | Nov. 16, 1971 |

[54] DEVICE FOR TRIMMING THE OUTERSIDES OF CARCASSES
9 Claims, 6 Drawing Figs.

| [52] | U.S. Cl. | 146/89,<br>146/203 |
|---|---|---|
| [51] | Int. Cl. | B02c 18/00 |
| [50] | Field of Search | 146/89, 91,<br>61, 89, 90, 92, 203 |

[56] References Cited
UNITED STATES PATENTS

| 2,827,657 | 3/1958 | Bettcher | 146/203 X |
| 1,039,800 | 10/1912 | Pysher | 146/91 |
| 1,205,052 | 11/1916 | Spencer et al. | 146/89 |

FOREIGN PATENTS

| 412,565 | 1/1946 | Italy | 146/92 |

Primary Examiner—Willie G. Abercrombie
Attorney—J. B. Felshin

ABSTRACT: The device can be hung by means of a flexible cord. It is portable and operated by an electric motor. The motor output shaft is geared to a rotary cylindrical cutter. The device is held by a handle and moved to run the cylindrical cutter over the outside of the carcass. Fat and grime is cut by knives on the cutter and the cuttings move to the inside of the cylinder and are pushed into a container on the device. The container has a cover which can be opened to dump the cuttings. A conical member fixed within the cylindrical cutter guides cutting to the open end of the cutter.

INVENTOR.
PAUL R. HIMES
BY
ATTORNEY

INVENTOR.
PAUL R. HIMES
BY
ATTORNEY

DEVICE FOR TRIMMING THE OUTERSIDES OF CARCASSES

BACKGROUND OF THE INVENTION

This invention relates to portable devices for trimming the outsides of carcasses.

DESCRIPTION OF THE PRIOR ART

Devices for scraping fat off the outsides of hams are known.

SUMMARY OF THE INVENTION

An object of this invention is to provide a trimming device of the character described which shall be portable and comprise a motor, a cylindrical cutter rotated by the motor and a container to receive the cuttings, which container has a closure which can be opened to dump the cuttings.

Another object of this invention is to provide in a device of the character described, a cutter having means therein to guide cuttings toward the container for the cuttings. Still another object of this invention is to provide in a device of the character described means to suspendingly support the device and means to guide the device over a carcass during the trimming operation.

A further object of this invention is to provide a strong, rugged and durable device of the character described which shall be relatively inexpensive to manufacture, easy to assemble and manipulate, easy to clean, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

DESCRIPTION OF THE PREFERRED EMBODIMENT

Figure 1:
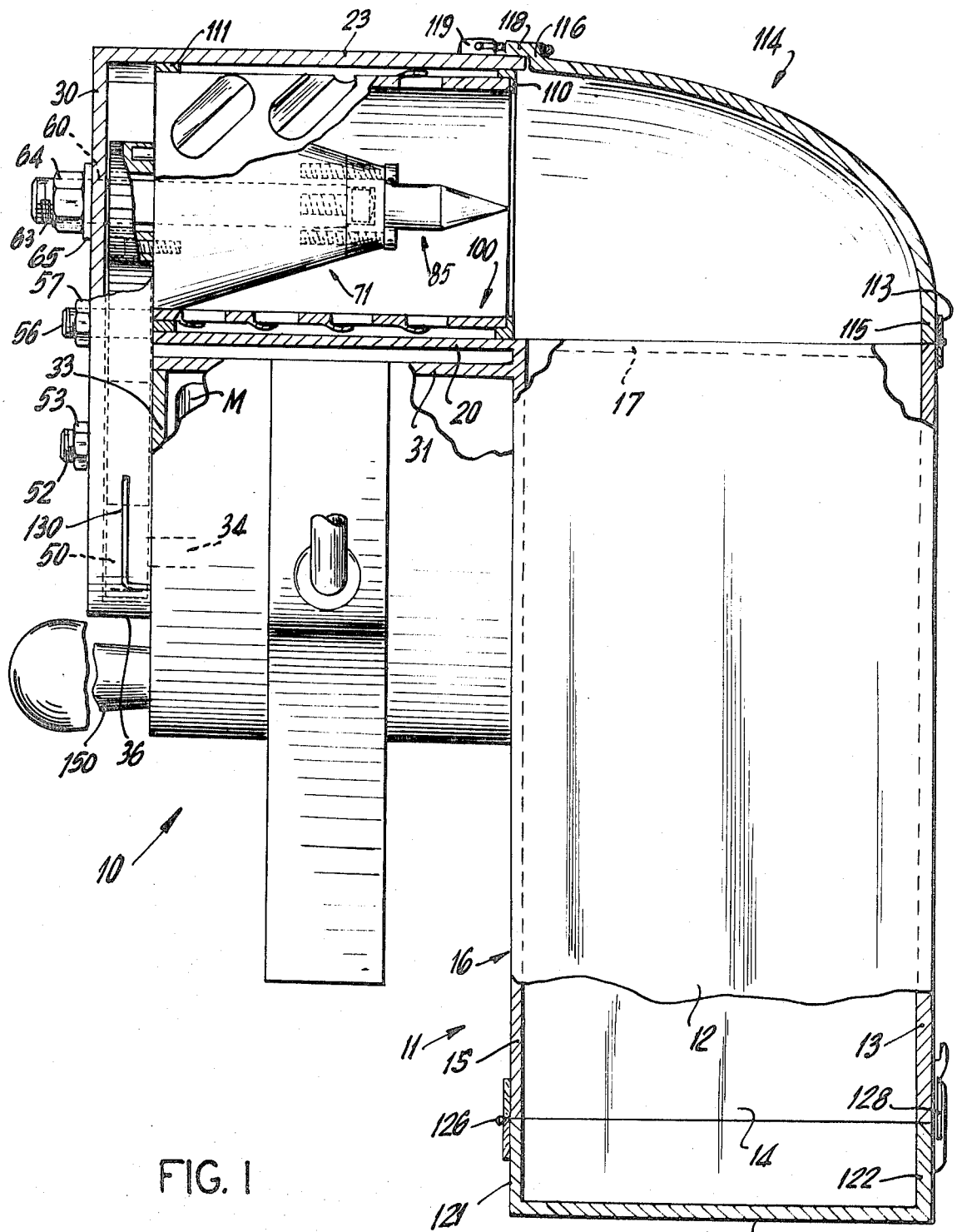
FIG. 1 is a top plan view of a carcass trimming device embodying the invention, with parts broken away and in cross section.
Figure 2:
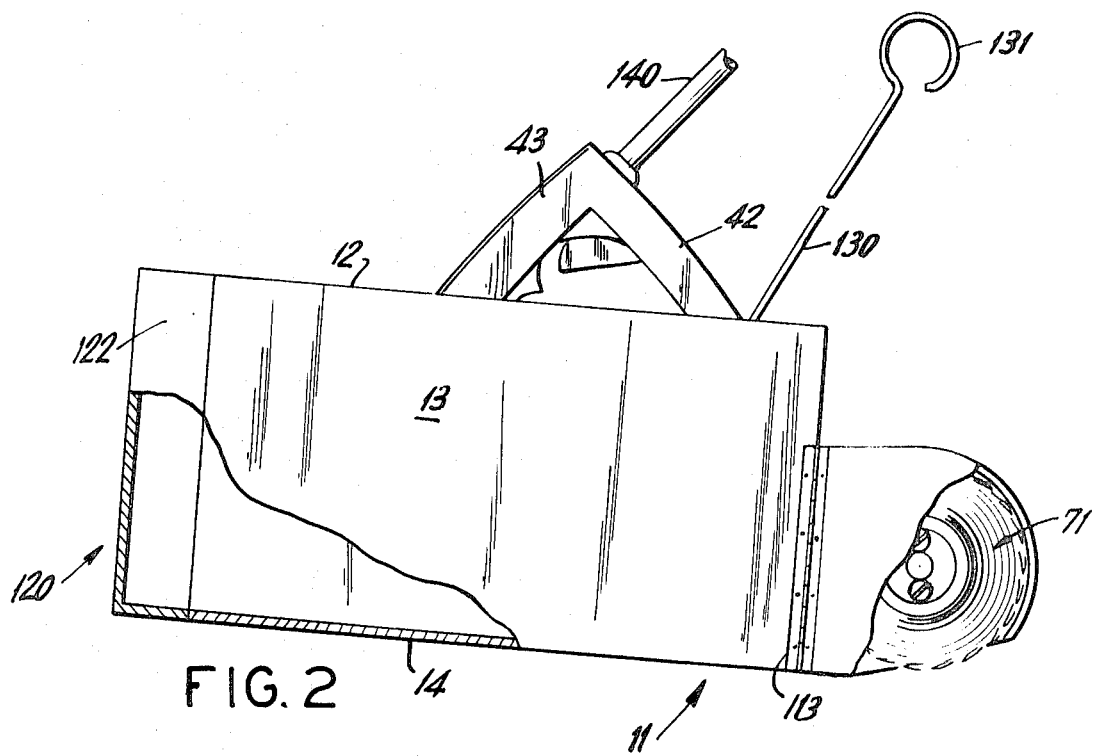
FIG. 2 is a side elevational view thereof, showing one side of the device with parts broken away and in cross section.

Referring now in detail to the drawing, 10 designates a device for trimming carcasses. Said device comprises a body or casting 11 provided with a flat top wall 12, an outer flat sidewall 13, a flat bottom wall 14 and an inner flat sidewall 15, all coextensive and forming a rectangular container 16. Extending from one end of container 16, at right angles to top wall 12 is a flat wall 17. Wall 17 interconnects top wall 12 with sidewalls 13, 15 and has a lower end edge 18, thus providing a rectangular opening at the front end of container 16.

Extending from wall 15 and offset therefrom to the left, looking at FIG. 1, at right angles thereto, is a wall 20 disposed below the level of wall 17.

Extending forwardly from the upper end of wall 20 is a flat wall 22 from which extends a part cylindrical wall 23 terminating in a straight transverse edge 24 located above the bottom wall 14. Extending from the lower end of wall 20 is a flat wall 25 having a front transverse straight edge 26 parallel to and spaced from straight edge 24, to provide an opening for the purpose hereinafter appearing.

Walls 22, 23, 25 extend equal distances to the left (looking at FIG. 1) beyond wall 20 and are interconnected by a wall 30 parallel to wall 15. Extending from wall 15, to the left looking at FIG. 1, is a cylindrical wall 31 forming a housing for an electric motor M housed therein. A cover plate 33 may close the motor housing and is formed with a central opening for the motor output shaft 34. Extending rearwardly from the side extensions of walls 22 and 25 are flanges 22a, 25a which converge and are interconnected by a substantially semicylindrical flange 36. Wall 30 extends rearwardly and connects to said flanges 22a, 36, 25a to form a housing 37 for drive means or gearing to be described hereinafter. Housing 37 overlaps the motor housing and the shaft 34. The inner edges of flanges 22a, 36 and 25a lie adjacent cover 33 and portions of the outer edges of wall 31. The cover 33 may be fixed to housing 31 in any suitable manner.

Fixed to housing 31 is a handle 40 having upwardly inclined arms 41, 42 interconnected by a handgrasp strap portion 43 formed at its inner side with four rounded notches 44 to receive the fingers of the operator.

Within housing 37 and fixed to the end of shaft 34 which projects into said housing is a pinion 50 which meshes with an idler pinion 51 fixed on a shaft 52 passing through an opening in wall 30, and held in place by a locknut 53 screwed to said shaft. Pinion 51 meshes with a pinion 55 fixed on a shaft 56 passing through an opening in wall 30 and held in place by a locknut 57 screwed to the outer end of said shaft.

At the axis of part cylindrical wall 23, wall 30 is formed with an opening 60. Extending through said opening 60 is a shaft 62 having a screw-threaded outer end 63. Screwed onto the outer screw-threaded end 63 of shaft 62 is a nut 64. A washer 65 on said shaft is interposed between nut 64 and wall 30. On said shaft 62 is a pinion 66 meshing with pinion 55. Pinion 66 is located within housing 37.

Mounted on said shaft 62 and located within the housing portion 22, 23, 25 is a cutter or trimmer 70. Said trimmer 70 comprises a frustoconical member 71 having an axial through bore 72 through which shaft 62 passes. Pinion 66 is formed with a plurality of equiangularly spaced countersunk openings 73 to receive headed screws 74 which screw into threaded openings 75 in the rear base portion of the frustoconical member 71. A locating pin 76 on the rear base end of said member 71 is received in an opening 77 in pinion 66.

The outer end of shaft 62 is formed with an axial screw-threaded opening 80 to receive a screw 81 having a head 81a. A washer 82 received on the shank of screw 81 is held by head 81a against the forward end 71a of member 71. A pointed tip member 85 of conical shape has a rear base surface 86 contacting said end 71a. The base 86 has a central socket 87 to receive the head 81a of the screw 81, and to contact washer 82.

Said conical tip 85 is formed with a plurality of equiangularly spaced longitudinal notches 88 have circular bases 89. Said tip is formed with longitudinal openings 90 extending from circular bases 89 to the rear base surface 86 of the tip 85. Screws 91 have heads 92 contacting surfaces 89, and shanks 93 passing through openings 90 and screwed into threaded openings 94 in end surface 71a of member 71, to attach said tip member 85 to said member 71.

Figure 5:
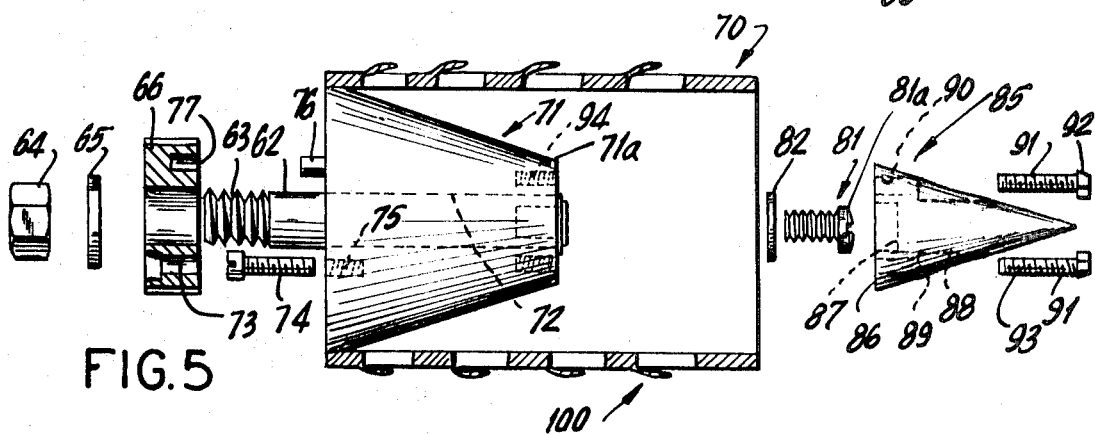
FIG. 5 is a disassembled cross-sectional view of the cutter assembly.
Figure 6:
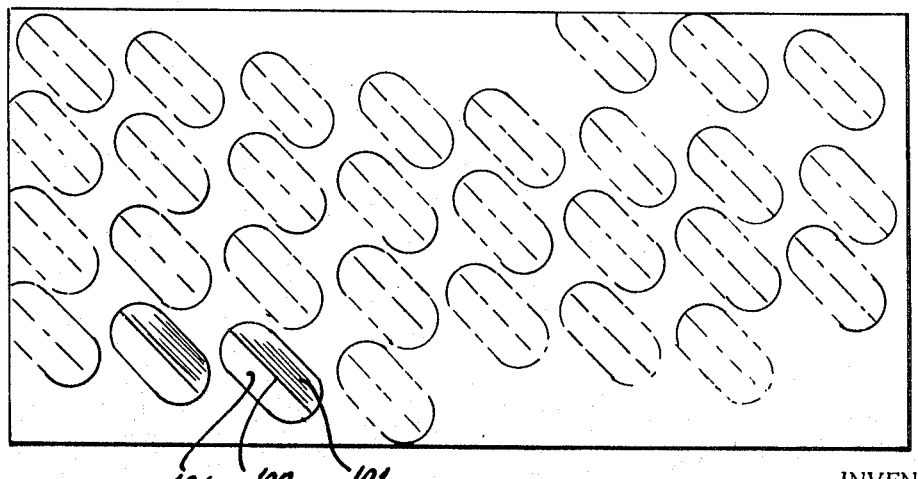
FIG. 6 is a flattened view of the cylindrical cutter.

The heads 92 of screws 91 are beveled off as shown in FIG. 5, so as not to project beyond the conical surface of member 85. Fixed to the periphery of the base of member 71 is a cylindrical cutter member 100. Said member 100 is preferably made of metal and has inclined, outwardly pouched blade or knife portions 101 having inclined cutting edges 102. Said cylinder is formed with inclined openings or passages 104 adjacent said cutter blades. The inclination of the blades is such that as fat is cut from a carcass by said blades, the cuttings will pass into the cylinder through openings 104 and will tend to move to the right, looking at FIG. 1, toward the point of the conical tip member 85.

Figure 3:
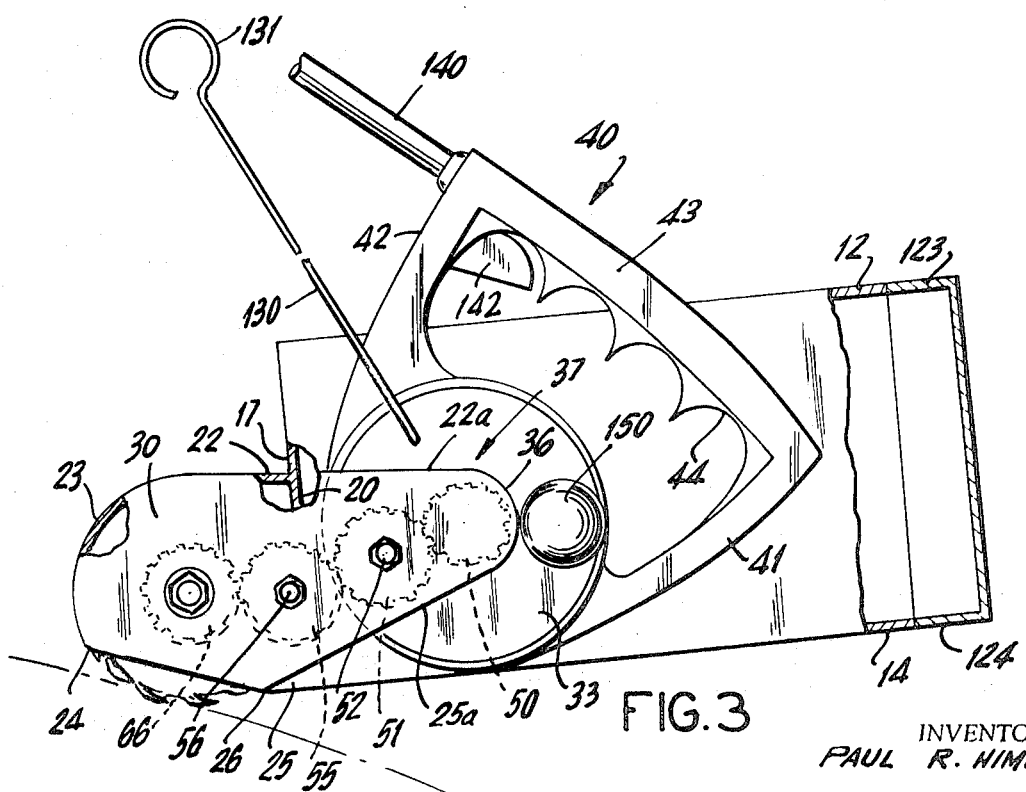
FIG. 3 is a side elevational view of the other side of the device, with parts broken away and in cross section.
Figure 4:
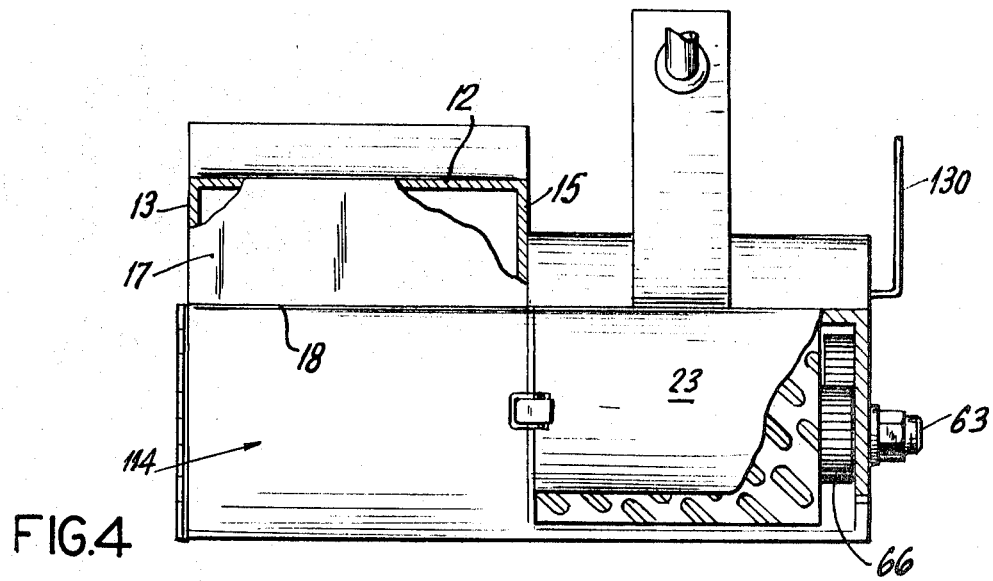
FIG. 4 is a front elevational view of the device, with parts broken away and in cross section.

It will be observed that part of the cylindrical cutter, as shown in FIG. 3 projects between edges 24 and 26 so as to contact the carcass as the tool is manipulated by the operator for a carcass-cleaning operation.

A bearing member 110 fixed within wall 23 journals the outer end of cylindrical cutter 100. A bearing 111 fixed in said wall 23 journals the base end of the cutter.

Means is provided to guide cuttings passing out of the cylinder 100 to the container 16. To this end, there is hinged to the forward end of wall 13, as by hinges 113, a cover 114 which is straight across at its hinged end 115 and is U-shaped at its opposite end 116, to match the U-shape of walls 122, 123, 125. Between ends 115, 116, the cover is shaped to streamline the flow of cuttings. Thus the transverse cross section of said cover changes from U-shape at one end gradually to straight at its other end (from left end to right end, looking at FIG. 1). The longitudinal cross section of the cover is curved at the middle and gradually straightening to the sides.

The curved end of the cover preferably has a lip 118 to receive an end edge of the cutter housing. The cover may be held in closed position by any suitable latch 119. The latch 119 may be similar to a hasp on a trunk, to keep the cover from accidentally opening.

Means is provided to close the outer end of container 16. To this end, a cover 120 is provided. The cover 120 has a wall 121 matching with wall 15, a wall 122 matching with wall 13, walls 123 and 124 matching with walls 12 and 14, respectively, and an outer wall 125 interconnecting walls 121, 122, 123, 124.

An edge of wall 121 is hinged, as by hinge 126, to wall 15. A latch 128 latches wall 122 to wall 13 to keep the cover closed. A latch like a hasp of a trunk may be employed for this purpose.

When container 16 is full, cover 120 is unlatched to dispose of its contents. For cleaning purposes, cover 114 is unlatched and swung back.

The cutter can be disassembled for cleaning when necessary.

A flexible cord 130 attached to some part of the body or motor housing has a hook or ring 131 at its upper end for connection to any suitable overhead hook or support so that the tool can be supported as it is being manipulated by an operator holding the handle 40. An electric cord 140 connected to the handle may have a plug at its outer end for connection to a suitable outlet. A trigger switch 142 is placed to be engaged by a finger of the operator grasping the handle to energize the motor.

The tool is held with the cutter end of the tool up, to facilitate moving the tool in such a way that the cutter blade contacts the carcass.

A straight handle 150 fixed to the motor housing may be grasped by the free hand of the operator to keep balance and move the tool.

It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative only.

I claim:

1. A tool of the character described comprising a body, a cylindrical cutter mounted on said body for rotation, an electric motor on said body, drive means interconnecting the output shaft of the motor with said cylindrical cutter, a container on the body to receive the cuttings, and means forming a passage from said cylindrical cutter to said container, said body having a portion surrounding a part of said cutter, and an opening exposing a part of said cutter, said container having an inlet end and an outlet end, and a cover on the outlet end of said container and adapted to be opened to remove the contents of said container, said passage-forming means comprising a member hinged to the inlet end of said container and engaging said part of the body surrounding said cutter, to guide cuttings from said cutter to said container.

2. A tool of the character described comprising a body, a cylindrical cutter mounted on said body for rotation, an electric motor on said body, drive means interconnecting the output shaft of the motor with said cylindrical cutter, a container on the body to receive the cuttings, and means forming a passage from said cylindrical cutter to said container, said cylindrical cutter having a conical member therein, the base of said conical member being fixed to one end of said cylindrical cutter, said cylindrical cutter being open at its other end and said conical member having its pointed end at the open end of said cylindrical cutter, said container having an inlet end and an outlet end, means to guide cuttings from the open end of the cutter to the inlet end of said container, said container having an outlet end, and an openable cover on the outlet end of the container, said guide means being swingable open to give access to the open end of said cutter.

3. The combination of claim 2, said body having a portion surrounding a part of said cutter and being formed with an opening, exposing a part of said cutter.

4. A portable handtool for trimming carcasses comprising a body, a cutter mounted on said body for rotation, an electric motor on said body, drive means interconnecting the output shaft of the motor with said cutter, a container on the body to receive the cuttings, and means forming a passage from said cutter to said container, said cutter being cylindrical and having a conical member therein, the base of said conical member being fixed to one end of said cylindrical cutter, said cylindrical cutter being open at its other end and said conical member having its pointed end at the open end of said cylindrical cutter, said conical member comprising a frustoconical base portion, and a conical tip portion removably attached to said frustoconical portion.

5. A portable handtool for trimming carcasses comprising a body, a cutter mounted on said body for rotation, an electric motor on said body, drive means interconnecting the output shaft of the motor with said cutter, a container on the body to receive the cuttings, and means forming a passage from said cutter to said container, said cutter being cylindrical and having a conical member therein, the base of said conical member being fixed to one end of said cylindrical cutter, said cylindrical cutter being open at its other end and said conical member having its pointed end at the open end of said cylindrical cutter said drive means comprising a shaft fixed to said body, a pinion rotatably mounted on said shaft, means controlled by the motor to rotate said pinion, and said conical member being rotatably mounted on said shaft.

6. The combination of claim 5, said conical member comprising a frustoconical base portion, and a pointed conical tip portion removably mounted on said base portion.

7. A portable handtool for trimming carcasses comprising a body, a cutter mounted on said body for rotation, an electric motor on said body, drive means interconnecting the output shaft of the motor with said cutter, a container on the body to receive the cuttings, and means forming a passage from said cutter to said container, said container having an inlet end and an outlet end, said passage forming means comprising means on the body to guide cuttings from said cutter to said container, said guide means being movable with respect to said body to give access to the cutter.

8. A portable handtool for trimming carcasses comprising a body, a cutter mounted on said body for rotation, an electric motor on said body, drive means interconnecting the output shaft of the motor with said cutter, a container on the body to receive the cuttings, and means forming a passage from said cutter to said container, said cutter being cylindrical and having a conical member therein, the base of said conical member being fixed to one end of said cylindrical cutter, said cylindrical cutter being open at its other end and said conical member having its pointed end at the open end of said cylindrical cutter, said container having an inlet end, and means on the body to guide cuttings from the outlet end of the cutter to the inlet end of the container, said guide means being movable relative to the body to give access to the open end of the cutter.

9. A portable handtool for trimming carcasses comprising a body, a cutter mounted on said body for rotation, an electric motor on said body, drive means interconnecting the output shaft of the motor with said cutter, a container on the body to receive the cuttings, and means forming a passage from said cutter to said container, said container having an inlet end and an outlet end, said passage-forming means comprising means on the body to guide cuttings from said cutter to said container, said container being disposed at right angles to said cutter, and said passage-forming means being located between said cutter and the inlet end of said container and comprising a curved wall to turn the cuttings through a right angle.

* * * * *